United States Patent
Grauman (10) Patent No.: US 6,707,472 B1
(45) Date of Patent: Mar. 16, 2004

(54) METHOD OF GRAPHICALLY FORMATTING E-MAIL MESSAGE HEADERS

(76) Inventor: Thomas Grauman, 114 Morningside Dr. #33, New York, NY (US) 10027

(*) Notice: Subject to any disclaimer, the term of this patent is extended or adjusted under 35 U.S.C. 154(b) by 381 days.

(21) Appl. No.: 09/690,621

(22) Filed: Oct. 17, 2000

Related U.S. Application Data (60) Provisional application No. 60/160,030, filed on Oct. 18, 1999.

(51) Int. Cl.$^7$ .......................... G09G 5/00; G06F 15/16; H04M 11/00
(52) U.S. Cl. ...................... 345/752; 709/206; 379/93.24
(58) Field of Search ...................... 345/752; 379/93.01, 379/93.24; 709/204, 206

(56) References Cited

U.S. PATENT DOCUMENTS 5,999,932 A * 12/1999 Paul ............................ 707/10

OTHER PUBLICATIONS

"Message Header Extensions for Non–ASCII Text" Moore. Network Working Group, RFC 1522. Sep. 1993.*
"Mechanisms for Specifying and Describing the Format of Internet Message Bodies" Borenstein et al. Network Working Group, RFC 1521. Sep. 1993.*
"Standard for the Format of ARPA Internet Text Messages" Crocker. RFC 822. Aug. 1982.*
"AOL Warns Members to Keep Passwords Under Wraps" Hu. Cnet News.com Jun. 2000.*

* cited by examiner

*Primary Examiner*—John Cabeca
*Assistant Examiner*—Brian Detwiler
(74) *Attorney, Agent, or Firm*—Amster, Rothstein & Ebenstein LLP (57) ABSTRACT

A method for providing a graphical display, called an e-envelope, for an Internet e-mail message. This is performed by adding formatting information to the header of the e-mail message, preferably by the use of special header fields called "Form Headers", which provide formatting specifications, in one aspect related to data carried in either the header or the body of the e-mail message. During creation of an e-mail message, a sender can choose formatting specifications for the e-envelope. These formatting specifications are then stored in Form Headers which are inserted into the header of e-mail message along with the existing conventional headers. An e-mail program receiving such an Internet e-mail message reads the Form Headers as well as the data to be formatted, if any. The e-mail program then merges the formatting specifications and linked data, if any, to create graphical interface elements corresponding to the formatted e-envelope specified by the sender for presentation to a recipient of the e-mail message.

8 Claims, 7 Drawing Sheets

```
X-RealMail-RENotice-Form: type=mask; side=front; bounds="20,131,181,252";
    state=inactive; data=external; autocontent=renotice; imagealign=center;
    imagescale=imagedefined; imagedrawingmode=transparent; imagesubtype=pict;
X-RealMail-FWNotice-Form: type=mask; side=front; bounds="32,191,192,276";
    state=inactive; data=external; autocontent=fwnotice; imagealign=center;
    imagescale=imagedefined; imagedrawingmode=transparent; imagesubtype=pict;
X-RealMail-Enclosures-Form: type=file; side=back; bounds="136,110,380,307";
    state=active; data=external; autocontent=subcontent; textfont=Helvetica;
    textsize=12; textalign=left;
X-RealMail-Label-Form: type=text; side=front; bounds="10,302,289,316";
    state=inactive; data=literal; autocontent=label; textfont=Helvetica; textsize=9;
    textalign=left;
X-Subject-Form: type=text; side=front; bounds="800,800,864,812"; state=active;
    data=literal; textfont=Helvetica; textsize=9; textalign=left;
X-RealMail-Opener-Form: type=text; side=front; bounds="228,189,409,202";
    state=inactive; data=literal; textfont=Helvetica; textsize=9; textalign=right;
X-Date-Form: type=text; side=front; bounds="228,177,409,190"; state=inactive;
    data=relative; textfont=Helvetica; textsize=9; textalign=right;
X-RealMail-To-Form: type=address; side=front; bounds="179,205,389,302"; state=active;
    data=literal; textfont=Helvetica; textsize=14; textalign=left;
X-RealMail-From-Form: type=address; side=front; bounds="9,112,234,205"; state=active;
    data=literal; textfont=Helvetica; textsize=14; textalign=left;
X-RealMail-Postage-Form: type=image; side=front; bounds="341,114,405,178";
    state=active; data=external; autocontent=postage; imagealign=center;
    imagescale=imagedefined; imagedrawingmode=opaque; imagesubtype=pict;
X-RealMail-Cancellation-Form: type=image; side=front; bounds="231,114,370,178";
    state=inactive; data=external; autocontent=cancellation; imagealign=center;
    imagescale=imagedefined; imagedrawingmode=transparent; imagesubtype=pict;
X-RealMail-Note-Form: type=file; side=front; bounds="18,279,176,298"; state=active;
    data=internal-body; autocontent=notename; textfont=Helvetica; textsize=9;
    textalign=left;
X-RealMail-Mask-Form: type=mask; bounds="0,0,424,323"; state=inactive; data=external;
    autocontent=mask; imagealign=southwest; imagescale=imagedefined;
    imagedrawingmode=opaque; imagesubtype=pict;
X-RealMail-Opener: "anonymous"
X-RealMail-Opener-Info: recipient;
    who="anonymous";
    where="unknown";
    when=Thu, 22 Jul 1999 01:03:24 -0400
X-RealMail-To: e-mail="alig@exmsft.com";name="alig@exmsft.com"
X-RealMail-To: e-mail="dustys@televar.com";name="dustys@televar.com"
X-RealMail-To: e-mail="davidba@exmsft.com";name="davidba@exmsft.com"
X-RealMail-To: e-mail="grauman@halcyon.com";name="grauman@halcyon.com"
X-RealMail-To: e-mail="marys@corbis.com";name="marys@corbis.com"
X-RealMail-To: e-mail="TomG@zoomorama.com";name="Tom Grauman"
X-RealMail-To: e-mail="DChun@OMM.com";name=""Chun. Deborah"";street1="10543 Crescent
    Moon Drive";city="Los Angeles";state="CA";zip=90828
X-RealMail-From: e-mail="NGrauman@OMM.com";name=""Grauman. Nancy"";street1="113
    Sunshine Lane";city="Santa Barbara";state="CA";zip=90021
Received: by u2.farm.idt.net for c6lbx5ps (with pop daemon (v1.21 1997/08/10) Mon Jul
    12 11:36:15 1999)
Message-ID: <E9563E144AE1D2119B140000F6CACB811DB090@labdcexmail03.omm.com>
From: "Grauman, Nancy" <NGrauman@OMM.com>
To: "'alig@exmsft.com'" <alig@exmsft.com>,     "'dustys@televar.com'"
    <dustys@televar.com>,     "'davidba@exmsft.com'" <davidba@exmsft.com>,
    "'grauman@halcyon.com'" <grauman@halcyon.com>,     "'marys@corbis.com'"
    <marys@corbis.com>,     Tom Grauman <TomG@zoomorama.com>, "Riley, Laura"
    "Chun, Deborah"    <DChun@OMM.com>
Subject: Women's Rights
Date: Wed, 14 Jul 1999 13:54:12 -0400
X-Priority: 3
X-MS-TNEF-Correlator: <E9563E144AE1D2119B140000F6CACB811DB090@labdcexmail03.omm.com>
MIME-Version: 1.0
X-Mailer: internet Mail Service (5.0.1457.3)
Content-Type: multipart/mixed;
    boundary="---- =_NextPart_000_01BECDFF.D3E13960"
```

Form Headers 200
Extra Data Headers 210
Data Headers and other headers 220

METHOD OF GRAPHICALLY FORMATTING E-MAIL MESSAGE HEADERS

CROSS-REFERENCE TO RELATED APPLICATIONS

This application claims priority under 35 U.S.C. §119(e)(1) of provisional application Ser. No. 60/160,030 filed Oct. 18, 1999.

FIELD OF THE INVENTION

The invention relates to the processing of e-mail message headers in a network-computing environment. In particular, the invention relates to the generation and display of user-interface formatting specifications carried in e-mail message headers.

DESCRIPTION OF THE RELATED ART

In a computer network, it is necessary to display a human-readable interface ("the interface") for e-mail messages transmitted between computers. A program which receives and/or processes e-mail normally displays the interface by reading descriptive information in the message and combining it with program resources such as typefaces, icons, patterns, color palettes, and controls. The human operator ("the user") interacts with the resulting display to gain access to and manipulate the message. The formal display attributes, i.e., the formatting, of the interface are generally consistent when sender and recipient use the same hardware and/or software. However, when a message leaves its native environment, interface formatting is lost. The Internet, a specific computer network, is a world-wide interconnection of computers, or servers, in business, academic, commercial, and personal use. A significant reason for the dramatic growth in the use of the Internet is the standardization and use of common protocols for the presentation and exchange of information. The use of common protocols allows almost anyone with access to a networked computing device, i.e., a computer, to connect to, and interact with, the Internet, regardless of the type of computer hardware and software an individual computer might employ.

Internet programs rely on common languages and supporting protocols to specify data for network resources. For example, the Hypertext Markup Language ("HTML") specifies data formatting for pages on the World Wide Web ("the Web"). Other languages important to the present invention include Extensible Markup Language ("XML") for describing data structures that extend current Internet markup languages. The Universal Resource Locator standard ("URL") provides a common way to describe inter-network data pathways. Finally, the standard for Multipurpose Internet Mail Extensions ("MIME") provides e-mail programs with a common framework for structuring the content of Internet-mail messages.

The standard protocol of Internet e-mail is known as the Simple Mail Transfer Protocol ("SMTP"). There are currently several versions of SMTP with more recent versions being backward-compatible to earlier versions. All versions of SMTP share the same basic organization, and all messages transmitted using SMTP, i.e., Internet e-mail, share the same basic structure.

An Internet e-mail message is comprised of two parts: headers and content. First are the headers, which together form the outside "envelope" (the "e-envelope") of the message. Second is the content, which is what one sees when one opens the message.

The primary function of the message headers is for routing the message from one computer to another. A secondary function of the headers is to carry an interface for the message, such as a subject line. In the past, interfaces for message headers and content were restricted to plain text. However, as the uses of e-mail have spread beyond inter-office memos to include the transmission of all kinds and types of communication, the demand for richer and more dynamic forms of information has lead to the adoption of HTML formatting for e-mail message content. The content of an e-mail message can now be as unique and rich as a Web page. Formatting for message headers, however, has not changed.

Internet e-mail message headers contain a series of fields. Some examples of common fields are "Subject", "From" and "To". Programs which receive and/or process e-mail messages use the data in these fields to display lists of e-mail e-envelopes. A person who wants to view an e-mail message selects an e-envelope in a manner consistent with the use of a conventional envelope.

Figure 6:
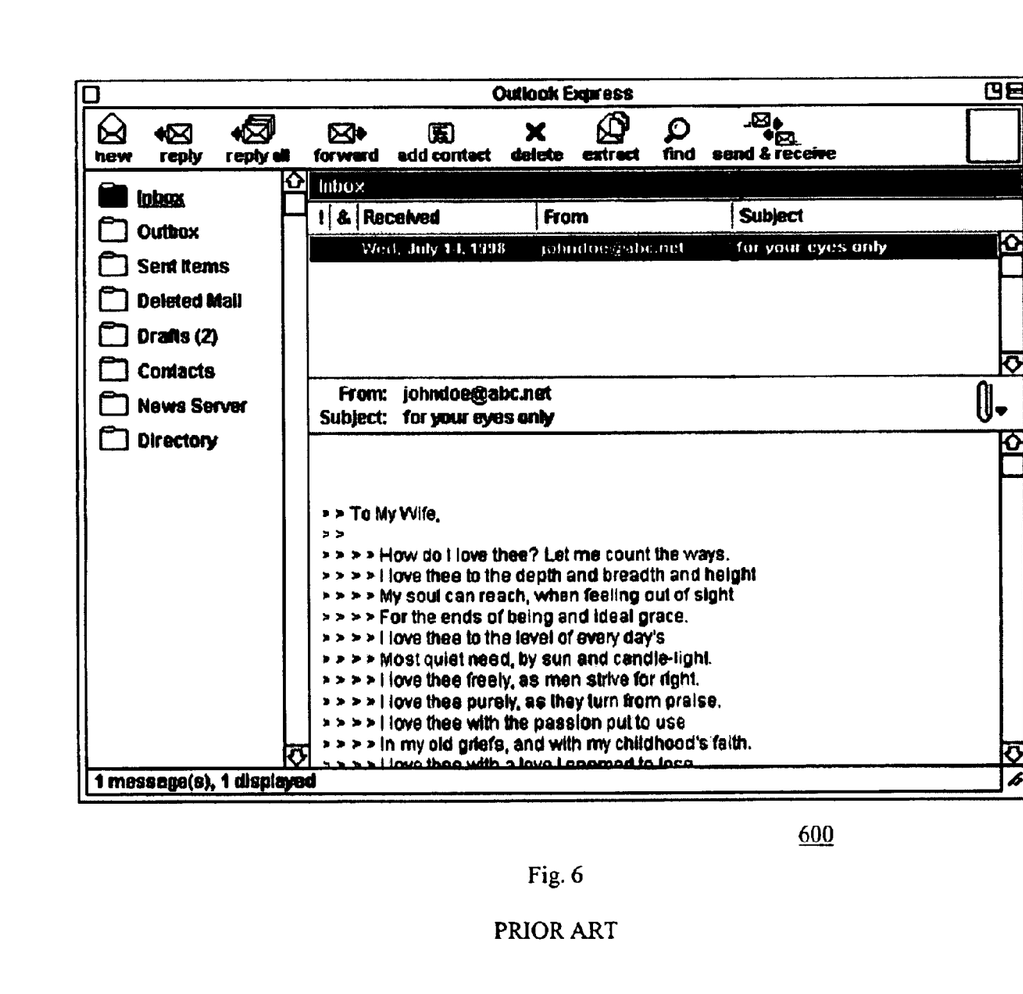
FIG. 6 is a simulated screen shot of a conventional e-mail program.

As demonstrated by simulated screen shot 600 of FIG. 6, most e-mail programs, such as Microsoft's Outlook Express, display e-envelopes in a scrolling textual list. Other programs, such as Microsoft's Bob Email, present e-envelopes as a stack of overlapping graphical conventional envelopes. Regardless of the method used to display them, e-envelopes for all messages are displayed the same way in any given program which receives and processes e-mail messages. There is no visual distinction based on the kind of e-mail as there is in the real world. Furthermore, since e-envelope formatting specifications are not carried with the message, the e-envelope interface will change when the message leaves its original program or network and arrives somewhere else.

In the physical world, conventional envelopes (and their variants) are designed to carry different kinds of information, much of which is private. These variants include postcards, letters, security envelopes, mailers, packages, etc. In addition, conventional envelopes are customizable, allowing senders to make their mailings more distinctive while helping recipients distinguish pieces of mail without opening them. Finally, conventional envelopes are universally significant artifacts with surfaces for affixing or stamping signifiers of the systems by which they are delivered. None of these important features of conventional mail are available to senders and recipients of Internet e-mail.

The present invention addresses these shortcomings. The main object and advantage of the present invention is to provide a method that makes it possible for people to use e-envelopes in a manner nearly identical to how conventional envelopes are used.

Various other objects, advantages and features of the present invention will become readily apparent from the ensuing detailed description and the novel features will be particularly pointed out in the appended claims.

SUMMARY

A method of generating graphical user interfaces for e-mail messages in which an e-mail message having an e-mail body and an e-mail header is first generated and then formatting associated with the e-mail message is selected for display. Next, the e-mail message is modified by inserting the formatting into the e-mail header. The modified e-mail message is saved to memory. Thereafter, the formatting associated with the e-mail message is displayed in graphical format to allow selection of the e-mail message.

In accordance with the present invention, people can modify the e-envelope of each Internet e-mail message in much the same way that they can and do with conventional mail. This is done through the use of special header fields called "Form Headers." Form Headers provide formatting specifications for data carried in the e-mail message. Three sources of data apply. First and most typical is data read from other message headers normally present such as message date, sender, subject line, etc. ("Data Headers"). Second is data read from the message content, such as a note or image to be displayed on the surface of a post card. Third is data inferred from the message, such as its size-on-disk or whether it has been received or not. Data to be formatted may be read literally or as a reference to something else, such as a URL for an image file available over the Internet. By using the present invention, senders gain more control over the presentation of Internet e-mail messages using formatted e-envelopes. Recipients also benefit because formatted e-envelopes make Internet e-mail richer, more informative, more intuitive, and easier to use.

In a further aspect, at least one Form Header is generated based upon the selected formatting and then the Form Header is inserted into the e-mail header and the display of the formatting requires that the at least one Form Header be first extracted from the e-mail header of the modified e-mail message and then that the formatting be extracted from the at least one Form Header for display. Preferably, at least one of the at least one Form Headers is linked to Data Headers within the e-mail header such that the generated graphical user interface includes formatting applied to data associated with the Data Headers.

A benefit of storing e-envelope formatting specifications in the message headers instead of the message content is that many programs which receive and/or process e-mail scan only the headers—which will normally fit easily into memory—when presenting messages to the user. Only when the user chooses to open a message is the content—which will often be too large to fit easily into memory—read as well. Putting e-envelope formatting specifications in the headers will enable these programs to display formatted e-envelopes where they otherwise could not.

The separation of Form Headers from the data they modify has advantages as well. One major advantage is due to the fact that the data in some headers may be modified and new headers may be added as the message works its way along the Internet. Separating Form and Data Headers makes it possible to display these dynamic headers as part of the e-envelope interface, e.g., as postmarks or stamps. Also, using separate Form Headers allows formatting to be introduced without touching data that may be structured according to SMTP, MIME, or another protocol or language, thereby avoiding the risk of header data corruption.

In a further embodiment of the present invention, headers inserted solely for interface-specific data ("Extra Data Headers") are used for interface graphics or text that provide additional customization of the e-envelope interface. For example, Extra Data Headers may be used to customize the display of a standard business e-envelope interface by adding a graphical logo and a textual caption, e.g., "Offer expires Dec. 21, 2001!"

As a result of using the present invention, senders gain control over the formatting of every e-envelope they send. For recipients, formatted e-envelopes are easier to distinguish in a list, making it possible to sort incoming mail without having to open and read each piece first. Developers of programs which receive and/or process Internet e-mail who apply the present invention will be able to provide their users with richer and more flexible e-envelope interfaces, adding significant value to their products and services. For all, the present invention allows e-envelopes to be displayed consistently in different computer programs and networks, dramatically extending the capabilities of e-mail communications.

BRIEF DESCRIPTION OF THE DRAWINGS

The following detailed description, given by way of example and not intended to limit the present invention solely thereto, will best be understood in conjunction with the accompanying drawings in which:

FIG. 3 is an example of the headers of a sample e-mail message having a Form Header.

DETAILED DESCRIPTION

Figure 1:
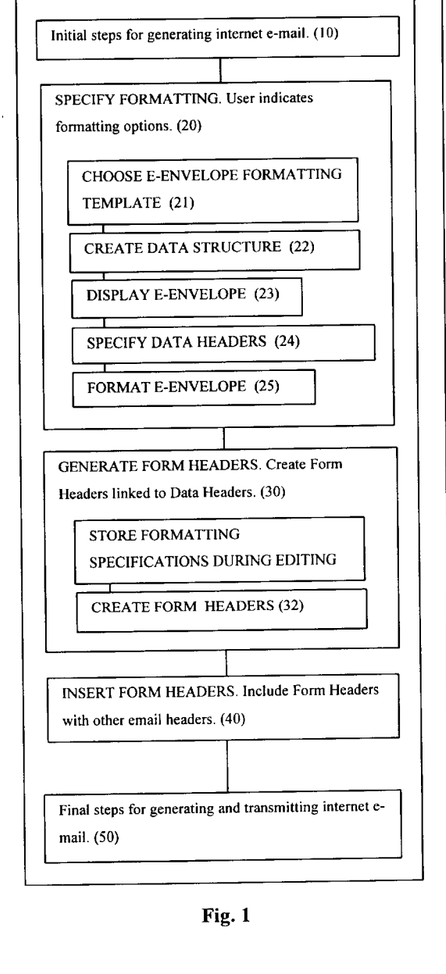
FIG. 1 is a flow chart of the process of creating an e-mail having a Form Header.

Referring now to the drawings, and in particular to the flowchart of FIG. 1, the process of generating an Internet e-mail message including Form Headers is disclosed. First, in step 10, a user indicates that a new e-mail message is to be generated. The most common method of doing this is by choosing from a menu, or pushing a dedicated button on a task bar. As one of ordinary skill will readily recognize, other methods exist in different programs. In response, an interface is displayed for creating the e-mail message. The user composes the e-mail message in conventional manner.

Next, in step 20, the user is provided with various options for e-envelope formatting. In the preferred embodiment, this step comprises five sub-steps. First, the user chooses an e-envelope formatting template from a group of pre-defined Form Headers which have been saved as e-envelope templates and stored within a template library (sub-step 21). Preferably, a template is a formatted e-mail message stored in a template directory, e.g., a photo-mailer for transmitting snapshots taken with a digital camera. Templates that correspond exactly to the content to be transmitted may be selected automatically. Otherwise, the user is presented with a list of available templates and prompted to choose one. Using e-envelope templates in accord with the preferred embodiment allows the user to start with a unified design instead of building from scratch, header by header. Other programs might default to a basic template in all cases, while still others might choose to have no template at all and present an entirely unformatted e-envelope.

In response to the selection of a template by the user, in sub-step 22 the program next creates and saves a new e-envelope data structure by copying from the selected e-envelope template. Preferably, Form Headers and Data Headers from the template are copied to generate the message headers of the new e-envelope, where this data structure is in the same format as the final headers.

Thereafter, in sub-step 23, the current e-envelope is displayed in its own window. The outline of this window is preferably modified to fit the outline region of the new e-envelope, creating an e-envelope object. Preferably, this window object appears on the screen as a conventional paper envelope, complete with a postage stamp, as specified by the message headers (see the front side 400 of an e-envelope in FIG. 4 and the rear side 500 of the same e-envelope in FIG. 5). All of the elements that form this interface are drawn from data in the message itself formatted according to the specifications carried in linked Form Headers. As one of ordinary skill will readily recognize, "envelope" is used here in its broadest sense to describe interfaces based on postcards, greeting cards, and parcels, as well as traditional paper envelopes.

Figure 4:
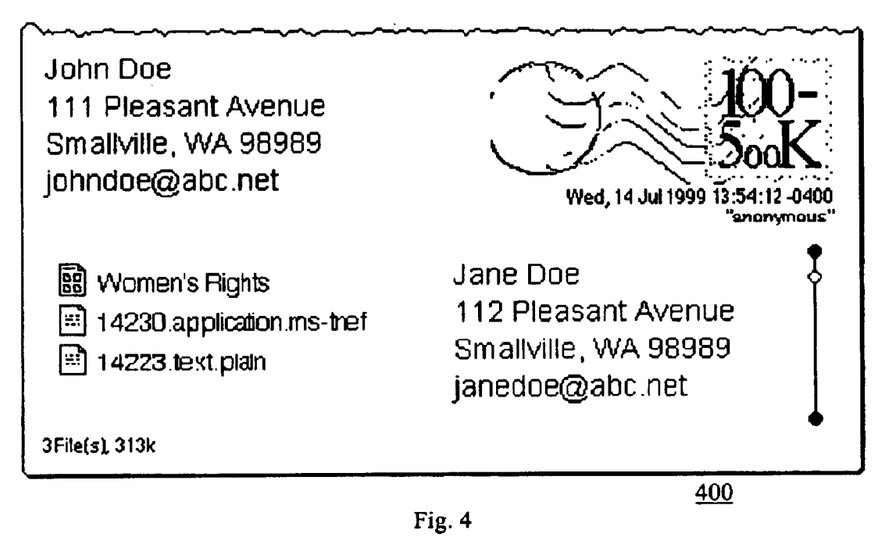
FIG. 4 is a simulated screen shot of a formatted e-envelope produced by the headers listed in FIG. 3.
Figure 5:
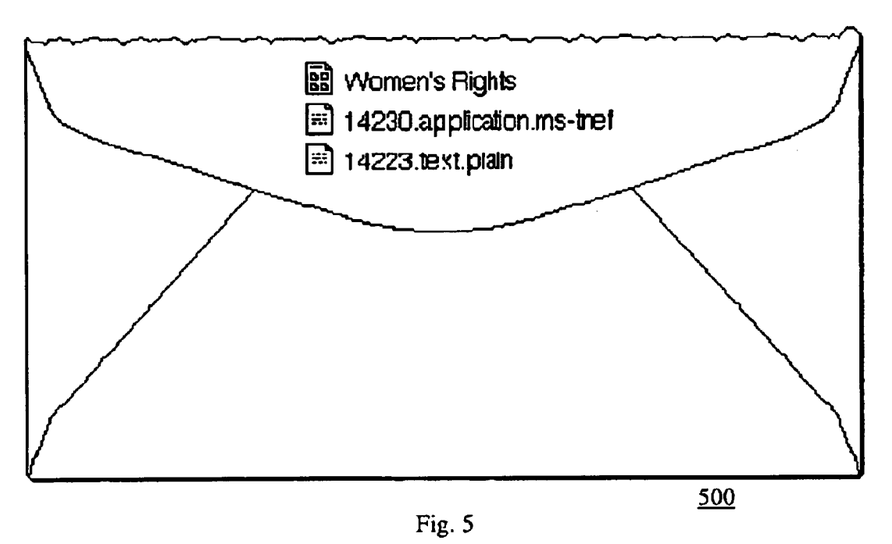
FIG. 5 is a simulated screen shot of the reverse side of the formatted e-envelope shown in FIG. 4.

Once the e-mail envelope is displayed, in sub-step 24 the user specifies the Data Headers by addressing the e-mail and making other changes using the e-envelope interface, in a conventional manner. Preferably, the user can "flip" the e-envelope window object to see interface elements on its other side, e.g., to look at the picture side of a postcard. The reverse side of envelope 400 of FIG. 4 is shown in FIG. 5. As one of ordinary skill in the art will readily recognize, other embodiments can provide different ways for the user to make changes.

Finally in sub-step 25, the user completes the formatting of the e-envelope. Preferably, the user may change the formatting of an e-envelope in one of a several ways, including: (1) by formatting an interface element, e.g., by formatting the Subject line as bold text; (2) by switching to a different pre-defined or user-created e-envelope template, e.g., by switching to a different birthday card design; (3) by selecting an interface element, e.g., choosing a "PRIORITY" icon; and (4) by hiding an element, e.g, hiding an unused CC: text field. As one of ordinary skill will readily recognize, various other methods may be used to change the formatting. Preferably, the user changes formatting using normal controls and techniques common to most word processing or page layout programs, e.g., by dragging an element to move it, by clicking a bold button to make selected text bold; by selecting and dragging the lower corner of an element to resize it; etc. Other methods may alternatively be used, such as voice commands or combinations of typed keys.

Preferably, Data Header data appears in custom controls placed inside an e-envelope window and formatted using "name=value" pairs read from a linked Form Header. Linked Form Header data therefore specifies the placement, type, and type-specific behavior of the interface element while remaining wholly independent of the data it represents.

In the preferred embodiment of the present invention, Form Header types include: (1) text (static or editable); (2) address; (3) file; (4) folder; (5) image; (6) mask; and (7) edit. Similarly, preferably the Form Header value names include: (1) type, side, bounds, state, flags, visible; (2) text font, text size, text face; (3) image align, text align; (4) transparency; and (5) color. As one of ordinary skill will readily recognize, the types and value names for Form Headers can easily be expanded to offer additional function and thus should not be limited to the disclosed, albeit presently preferred, embodiment. Although some value names unique to this invention might be best managed through standardization, the use of existing formatting languages such as HTML and XML provide a common format for the preferred embodiment.

Once the formatting is specified (step 20), it is necessary to generate the form headers in step 30. In particular, in step 30, Form Headers are created and linked to Data Headers. Preferably, step 30 comprises two sub-steps. First, in step 31, the formatting specifications are stored within the e-envelope window's controls while the e-envelope is visible on the screen, in conventional manner. In alternative embodiments, the formatting specifications are stored in a temporary data structure or in their final form directly in the e-mail message headers. Next, in step 32, at the user's direction, e.g., prior to sending the e-mail message, the Form Headers are generated in their final form and written into the e-mail message headers. This is accomplished in the same manners as with conventional e-mail message headers. By maintaining Form Headers in this way, e-mail can be uploaded for transmission without any special processing of Form Headers. In an alternative embodiment, the Form Header data is stored in private data structures and only written into the current e-mail message as it is uploaded for transmission.

In order to generate new Form Headers or to modify existing Form Headers, a machine-readable link must be established with the Data Header the Form Header refers to. Ideally this link will also be human-readable for the sake of future header evolution. Many methods of linking may be considered. In the preferred embodiment the link is established by name association. A Form Header name is created by taking the name of its linked Data Header and appending the text constant "Form" separated by a hyphen. Examples include the following:

| Data Header | Form Header |
| --- | --- |
| Subject | Subject-Form |
| From | From-Form |
| X-Priority | X-Priority-Form |

For compliance with MIME, "X-" is appended to the front of all Form Header names, if not already present, to flag these headers as "experimental" e-mail message header modifications. As a result, the following Form Headers are actually used:

| Data Header | Form Header (per MIME) |
| --- | --- |
| Subject | X-Subject-Form |
| From | X-From-Form |
| X-Priority | X-Priority-Form |

As one of ordinary skill in the art will readily recognize, other methods of linking the Form Header to the Data Header are easily implemented. For example, unique Form Header names may be generated using a simple naming algorithm, inserting the name of each linked Data Header into the Form Header field in a name=value pair, as follows:

| Data Header | Form Header (per MIME) |
|---|---|
| Subject | X-MailForm1: source = subject |
| From | X-MailForm2: source = from |
| X-Priority | X-MailForm3: source = x-priority |

As one of ordinary skill in the art will understand, it is possible to embed all the formatting specifications for the e-envelope in a single field. However, in the preferred embodiment, multiple fields are used to stay safely within header line-length limitations, since, although SMTP allows headers to be "folded" to accommodate long fields, many e-mail clients and servers limit even folded headers to 255 or fewer characters.

In an additional aspect of the present invention, the formatting specifications may be compressed and encoded. However, this is not performed in the preferred embodiment because it might lead to problems for human readers, especially for developers building e-envelope interfaces for new platforms. As a result, the preferred embodiment uses English name=value pairs to describe formatting specifications. For example, although formatting specifications may be tightly encoding like this:

Subject: Let's meet for lunch!

X-Subject-Form: 113CF3483CE59CA9F34859CA

In the preferred embodiment, the formatting specifications are in the more verbose but human-readable form:

Subject: Let's meet for lunch!

X-Subject-Form: type=text; side=front; bounds="6,302,289,316"; state=active; data=literal; textfont=helvetica; textsize=9; textalign=left;

By embedding formatting specifications in this manner, the necessity of adding such specifications into pre-existing Data Headers is avoided, which may result in corrupted e-mail data and is therefore cause problems with the valid transmission of such e-mail data.

Next, in step 40, Form Headers are included with the other, i.e., conventional, e-mail message headers. Although, as one of ordinary skill in the art will readily recognize, there are many ways to perform this step, in the preferred embodiment, the Form Headers are maintained in memory with the e-mail message and thereafter inserted and modified as needed. Therefore, uploading of the e-mail can occur without any special processing of Form Headers. In a first alternative embodiment, the e-mail message is maintained internally and the Form Headers are generated on the fly at the time the e-mail is uploaded to a mail server for transmission. In a second alternative embodiment, the Form Headers are generated and inserted into e-mail messages at the server as e-mail is forwarded from one mail server to another. By this second alternative embodiment, the invention may be applied at the server level such that e-envelopes are appended to e-mail messages as they pass through the server, e.g., by looking up e-envelope templates from a Web-based e-envelope server.

One way to optimize the insertion of Form Headers and reduce message size is to remove unnecessary Form Headers before transmitting the e-mail message. Unnecessary Form Headers include common Form Headers that are both standardized and predictable to the receiving program based on other aspects of the e-mail message, such as Form Headers for common MIME Content Types (text/plain, multipart/mixed, etc.). Thus Form Headers (and not just the data to which they refer) for common e-mail types can be cached outside the e-mail message and merged back in at a later point in the process. For example, a Web-based e-mail client could insert cached Form Headers just before displaying the e-envelope. In the preferred embodiment, a library of designs for common MIME Content Types would be available on the Internet as a library of ready-to-insert Form Headers. An added benefit of this optimization step for recipients is the enrichment of interfaces for common Internet message types regardless of whether or not the sending program has implemented the method of the present invention.

Finally, at step 50, the e-mail message, including a body and a header, is uploaded to a mail server for transmission to one or more recipients.

Referring now to FIG. 3, an Internet e-mail header according to the present invention comprises a conventional header section 220, an Extra Data Header section 210 and a Form Header section 200.

Figure 2:
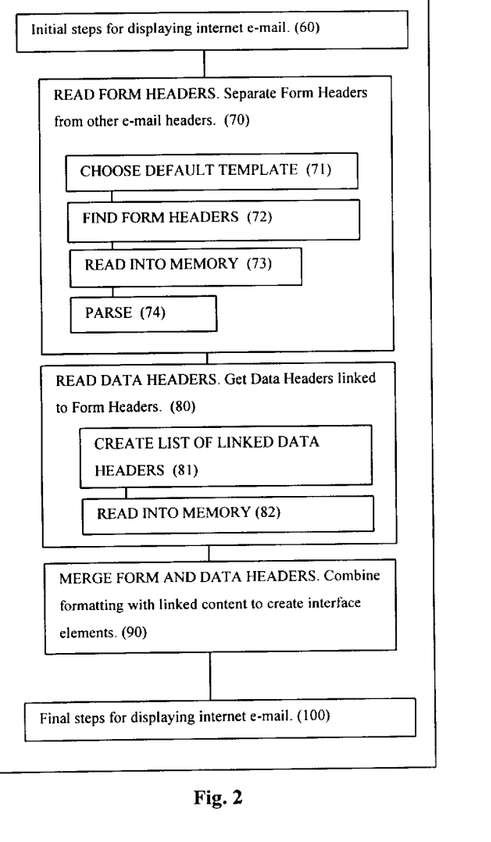
FIG. 2 is a flow chart of the process of displaying an e-mail having a Form Header.

Referring now to the flowchart of FIG. 2, the process for displaying an e-mail message including a Form Header is shown. This process applies to sending, receiving, composing, and all other frequent processes that conventionally display information about an e-mail message, and according to the present invention, display formatted e-envelopes for Internet e-mail messages, i.e., a formatted e-envelope may also be displayed in the sender's internal list of previously sent e-mail messages, as well as in a recipient's list of received e-mail messages.

The initial step 60 for displaying an e-envelope associated with an Internet e-mail is conventional and typically involves a user request to view a newly received e-mail, which is most commonly performed by launching a program which receives and/or processes e-mail, checking (either manually or automatically) for new messages (or opening a folder containing stored messages), and then selecting an e-mail from a list of e-mail messages, although other methods exist in different e-mail programs. Most programs which receive and/or process e-mail display only one design for all e-mail messages, most commonly one that looks like an office memo (see FIG. 6). As mentioned above, a list of Internet e-mail messages is displayed often during normal use of this type of program, including when e-mail messages are sent, received, or being composed.

The next step 70 in displaying e-envelopes associated with e-mail messages involves reading the Form Headers from the header of the selected e-mail message. This step requires access to formatting specifications as well as data from the message headers and message body. Although, as one of ordinary skill in the art will readily recognize, there are many possible ways to extract this information from the selected e-mail message, in the preferred embodiment, the formatting specifications in the Form Headers are obtained in a usable form by performing four sub-steps.

The first sub-step 71 is to choose a default template from a default set of Form Headers for the given MIME Content-Type in a local template library, allowing subsequent formatting to be introduced by exception to default specifications. The second sub-step 72 requires that the Form Header within the e-mail message header be identified by scanning each header to determine whether or not it is a Form Header, since Form Headers may appear in any order with the e-mail message header. In the preferred embodiment, Form Headers are distinguished by use of a text constant "Form" attached with a hyphen to the end of its name, e.g., X-To- Form. Form Headers are also, by MIME convention, defined as external headers, requiring that an "X" be attached with a hyphen to the front of its name. Examples of such Form Headers include;

| Data Header Name | Form Header Name |
|---|---|
| To | X-To-Form |
| Subject | X-Subject-Form |
| X-Priority | X-Priority-Form |

In the preferred embodiment, the following algorithm is used to infer the presence of a Form Header. All the header names are scanned looking for names that begin with "X-" and end with "-Form", and then each Form Header is tested for validity by looking up a required formatting specification, such as "bounds."

The third sub-step 73 simply reads any identified Form Headers into memory. The final sub-step 74 parses the Form Headers to extract their linked data. Form Header types may be read in a specific order based on specified type or alpha-layering values. For example, in the preferred embodiment, a MASK Form Header is always first identified to create the local coordinate system and visual context of the new e-mail object window.

In an additional embodiment of the present invention, user interface elements may be generated immediately, using default data, and the e-mail data is inserted thereafter. Also, further embodiments may look up a Form Header for a common Data Header without scanning all of the headers, which is useful where it was desired to simply obtain text size and color formatting specifications for the "Subject" header, for example, by looking directly at the data in an "X-Subject-Form" header.

In the next step 80 of the present invention, the data linked to the Form Headers from the e-mail message is accessed. This linked data is usually within Data Headers, although, as mentioned above, it may also occur in the message body or from an inference such as message size. Although, as one of ordinary skill in the art will recognize, there are numerous ways to obtain such linked data, in the preferred embodiment, step 80 comprises two sub-steps.

First, in sub-step 81, a list of linked Data Headers is created. The wide use of text constants in Internet e-mail message headers makes it possible for programs using the present invention to anticipate the presence of common Data Headers, such as To, From, Date, CC, and Subject, without physically extracting their names from Form Headers. In fact, it may be desirable to read Data and Form Headers in any order, depending on the method used to link them. Preferably, Form Headers in memory are scanned to build a list of possible Data Header names. In the preferred embodiment, each Data Header name is embedded literally in its linked Form Header name although other embodiments may insert the Data Header name as Form Header data. In either case, the result of this step is a list of linked Data Header names.

In the next sub-step 82, the linked Data Headers are then copied from the e-mail message into memory. A special case arises when no Data Header is present for a given Form Header. Although, as one of ordinary skill will readily recognize, there are various ways to handle this case, in the preferred embodiment, it is assumed that the linked data does not exist in the e-envelope and should be generated on the fly or looked up from an external source. In this manner, the preferred embodiment makes use of pre-defined formatting values to indicate alternate data sources. For example, an "autocontent" value used in the preferred embodiment instructs the displaying program to generate descriptive data, such as size or number of attachments, on the fly, without looking for a linked Data Header. In another example, a "source" value used in the preferred embodiment instructs the displaying program to pull data from a source outside the message headers, using a hierarchical search path similar to those used in Web browsers. URLs may also be embedded in Form Headers, although the recommended technique would be to carry the URL in an Extra Data Header linked to its own Form Header.

Next, in step 90, the formatting specifications are combined with linked data to create interface elements. Again, although there are many possible ways to combine the information and create interface elements, as recognized by one of ordinary skill in the art, in the preferred embodiment the formatting specifications and linked data are merged from one Form Header at a time to create the elements of the e-envelope interface. To insure consistency across different platforms and devices, each Form Header contains explicit specifications for the formatting of linked data in interface elements generated on the fly. Other embodiments may use a similar process to set the properties of pre-existing interface elements.

As understood by one of ordinary skill in the art, the structures of the user interface elements will vary depending on the kind of program and device and the creation of interface elements may be conventional in manner.

Special operations might be required when linked data is merged "by reference", meaning that the data to be displayed is not present literally but refers instead to a data source, usually in a file stored outside the message. This is most common in the case of non-text data. When passing data by reference, the sender and receiver must agree on data formats, search pathways, event inheritance, and a common reference language, such as Internet-standard URLs. For example, the preferred embodiment first looks for referenced data in the message headers and then in the message body before looking in directories outside the message.

In the preferred embodiment, a special MASK Form Header is first read to create a window object for the e-envelope and to establish the local coordinate system and visual context in which the other interface elements will appear.

The final step 100 is directed to the conventional process of displaying Internet e-mail messages associated with the e-envelopes.

After creating new interface elements, the preferred embodiment provides an interface for manipulating (opening, sending, editing, forwarding, replying to, copying, etc.) the selected message. Other embodiments might paste the e-envelopes on a Web page. A more involved editing program would allow each interface element to be adjusted slightly for the sake of further personalization. A program such as Microsoft Publisher, for example, could help users make new e-envelope designs and save them as templates for future use, without ever sending them or even connecting to the Internet.

Figure 7:
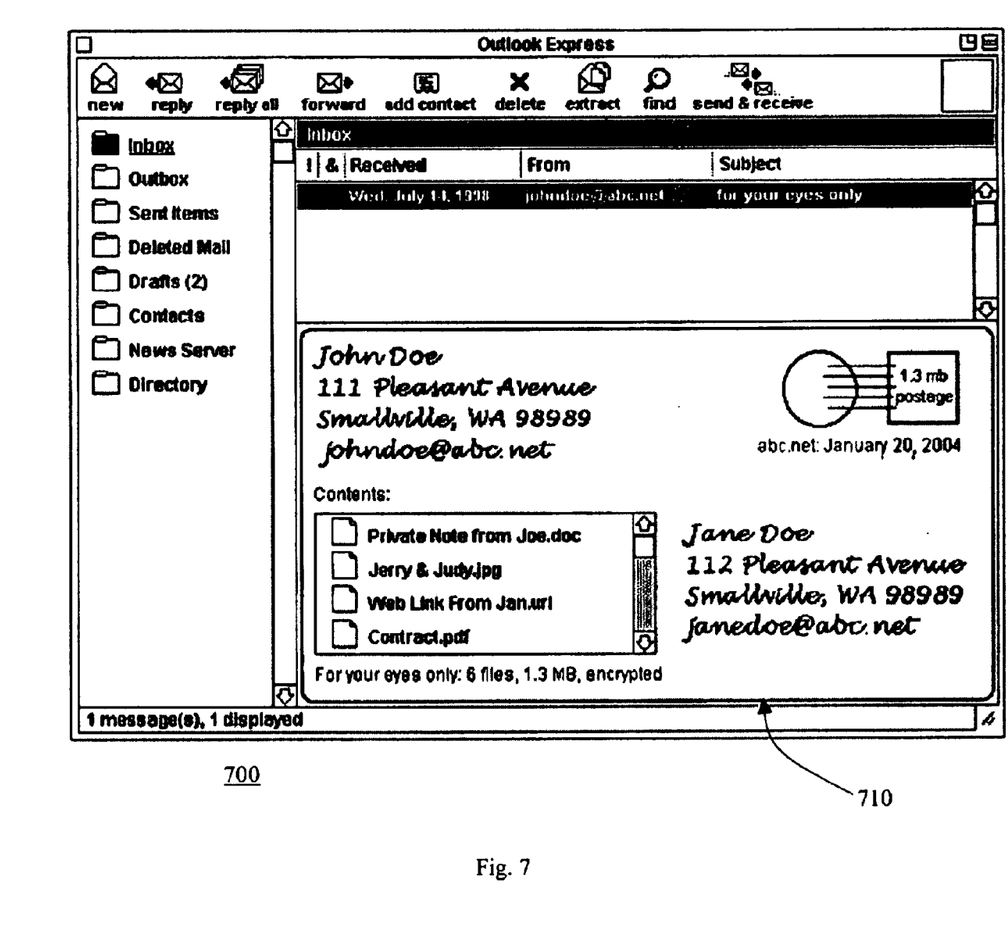
FIG. 7 is a simulated screen shot of a conventional e-mail program modified to use Form Headers to display a formatted e-envelope.
Figure 8:
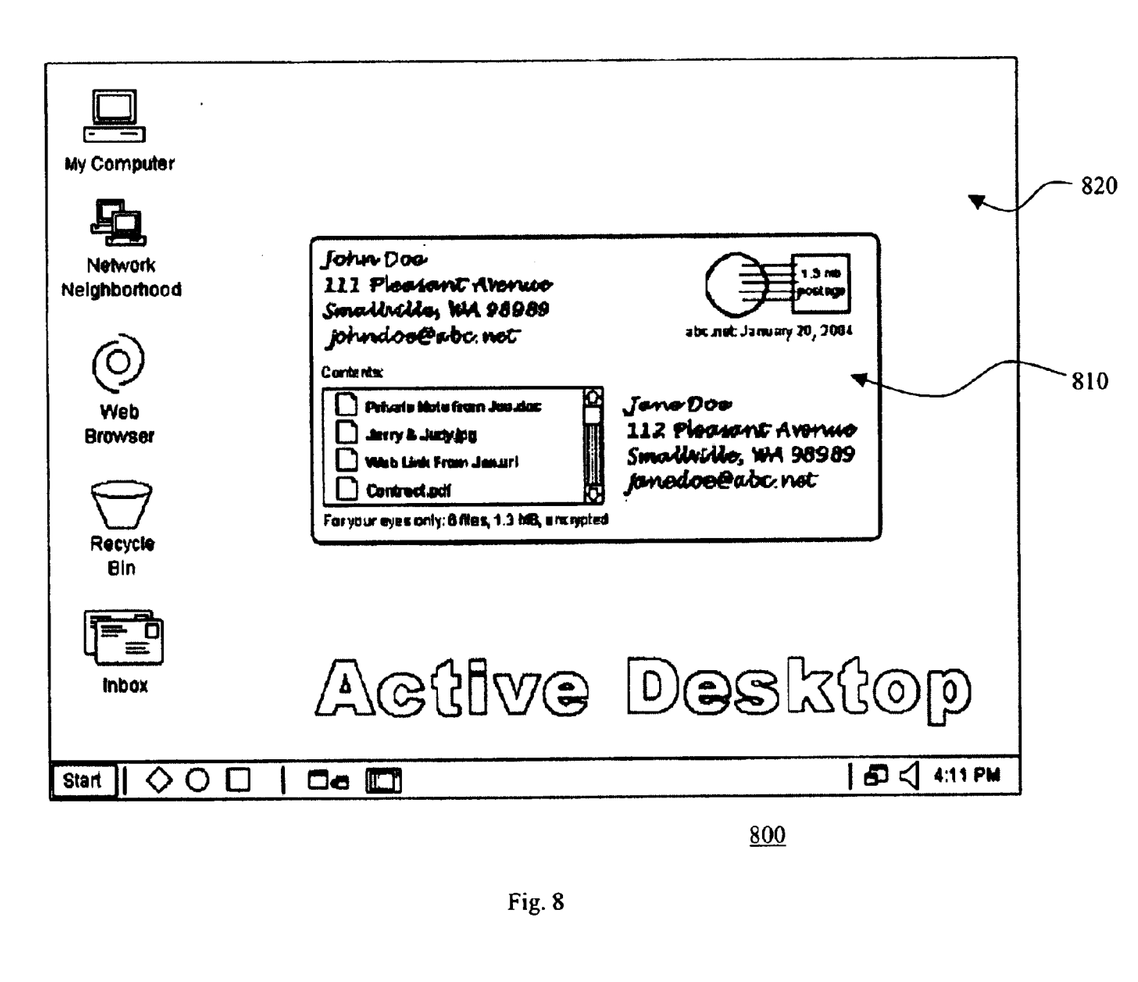
FIG. 8 is a simulated screen shot of a Form Header enabled e-mail message posted directly on a user's desktop.

A significant aspect of the present invention is that the type of program or method of retrieving and displaying an Internet e-mail message is not relevant to the present invention, since the present invention has universal application. For example, Internet e-mail messages may be used to transmit all kinds of data from point-to-point and that the interface seen by the user may not appear as would a conventional e-mail program. For example, "magazines"

packaged and delivered as Internet e-mail could be placed directly on the users "desktop" in the background, without visible interaction by an e-mail program. Referring to the simulated screen shot 700 of FIG. 7, an e-envelope 710 is shown displayed graphically within an e-mail program, whereas simulated screen shot 800 in FIG. 8 discloses an e-envelope 810 displayed on a desktop 820.

Figure 9:
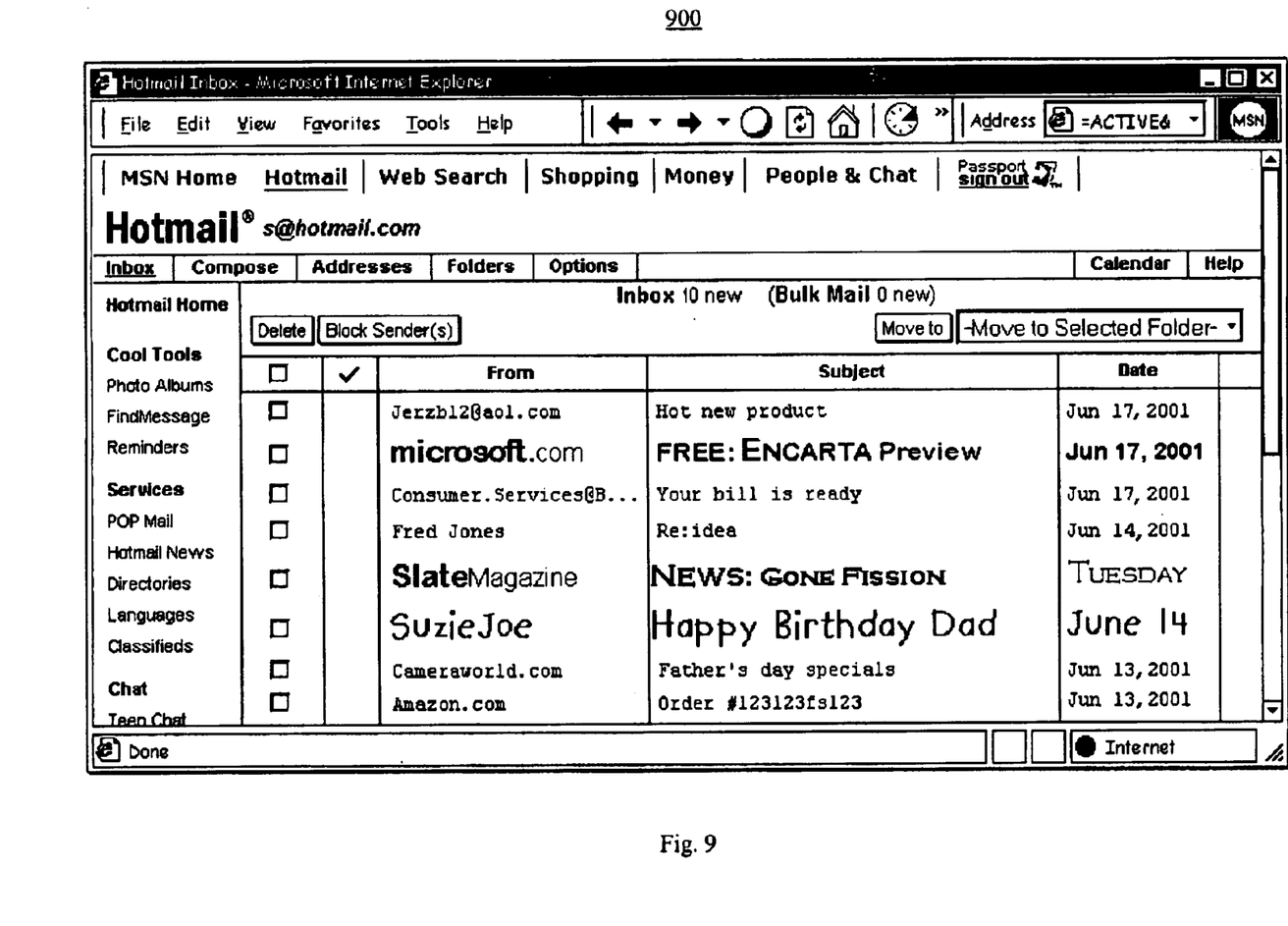
FIG. 9 is a simulated screen shot of a Form Header enabled list of e-mail messages in an e-mail program.

While the present invention has been particularly shown and described with reference to the preferred embodiments and various aspects thereof, it will be appreciated by those of ordinary skill in the art that various changes and modifications may be made without departing from the spirit and scope of the invention. For example, other, less involved embodiments might provide options for simple data formatting in the memo interfaces and message lists used by most e-mail programs. For example, Microsoft Outlook Express 5 might put buttons next to its edit fields for To, From, Cc, Subject, etc., to allow the sender of an e-mail message to specify bold, italic, or color text for those fields. Then, as shown in the simulated screen shot 900 of FIG. 9, the receiving e-mail program could display the selected formatting in its "Inbox" message list. It is intended that the appended claims be interpreted as including the embodiments described herein, the alternatives mentioned above, and all equivalents thereto.

What is claimed is:

1. A method of generating a graphical user interface for an e-mail message, comprising the steps of:
   (A) generating an e-mail message having a body and a header for transmission to one or more recipients in a predetermined character set;
   (B) selecting formatting associated with said e-mail message for display by said one or more recipients, said formatting providing visual characteristics to said predetermined character set;
   (C) modifying said e-mail message by inserting said formatting into said header;
   (D) transmitting said modified e-mail message to said one or more recipients; and
   (E) upon reception of said modified e-mail message, displaying said formatting associated with said modified e-mail message in graphical format.

2. The method of claim 1, wherein said step of modifying said e-mail message comprises generating at least one form header based upon said selected formatting and then inserting said at least one form header into said e-mail header and said step of displaying said formatting comprises extracting said at least one form header from said e-mail header of said modified e-mail message and extracting said formatting from said at least one form header for display.

3. The method of claim 2, wherein at least one of said at least one form headers is linked to data headers within said e-mail header such that said generated graphical user interface includes said formatting applied to data associated with said data headers.

4. A method of generating graphical user interfaces for e-mail messages, comprising the steps of:
   (A) generating an e-mail message having an e-mail body and an e-mail header in a predetermined character set;
   (B) selecting formatting associated with said e-mail message for display, said formatting providing visual characteristics to said predetermined character set;
   (C) modifying said e-mail message prior to transmission by inserting said formatting into said e-mail header;
   (D) saving said modified e-mail message; and
   (E) displaying said formatting associated with said modified e-mail message in graphical format.

5. The method of claim 4, wherein said step of modifying said e-mail message comprises generating at least one form header based upon said selected formatting and then inserting said at least one form header into said e-mail header and said step of displaying said formatting comprises extracting said at least one form header from said e-mail header of said modified e-mail message and extracting said formatting from said at least one form header for display.

6. The method of claim 5, wherein at least one of said at least one form headers is linked to data headers within said e-mail header such that said generated graphical user interface includes said formatting applied to data associated with said data headers.

7. A method of generating graphical user interfaces for e-mail messages having an e-mail body and an e-mail header, comprising the steps of:
   (A) selecting formatting associated with an e-mail message for display in a predetermined character set;
   (B) generating at least one form header based upon said selected formatting, said formatting providing visual characteristics to said predetermined character set;
   (C) modifying said e-mail message prior to transmission by inserting said at least one form header into said e-mail header;
   (D) saving said modified e-mail message; and
   (E) extracting said at least one form header from said e-mail header of said modified e-mail message, extracting said formatting from said at least one form header and displaying said formatting associated with said e-mail message in graphical format.

8. The method of claim 7, wherein at least one of said at least one form headers is linked to data headers within said e-mail header such that said generated graphical user interface includes said formatting applied to data associated with said data headers.

* * * * *